April 19, 1927.
L. B. NEIGHBOUR
1,625,139
AXLE CONNECTION FOR VEHICLES
Filed Aug. 4, 1921
3 Sheets-Sheet 1
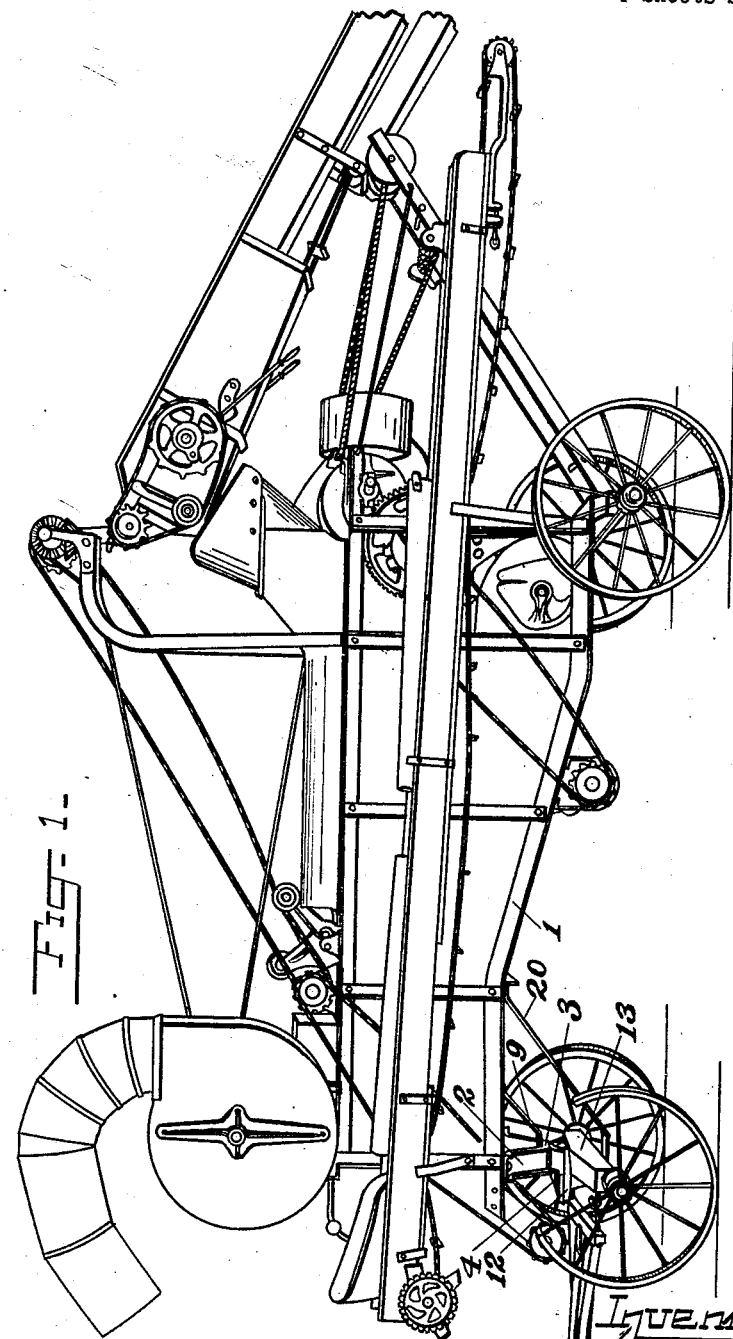

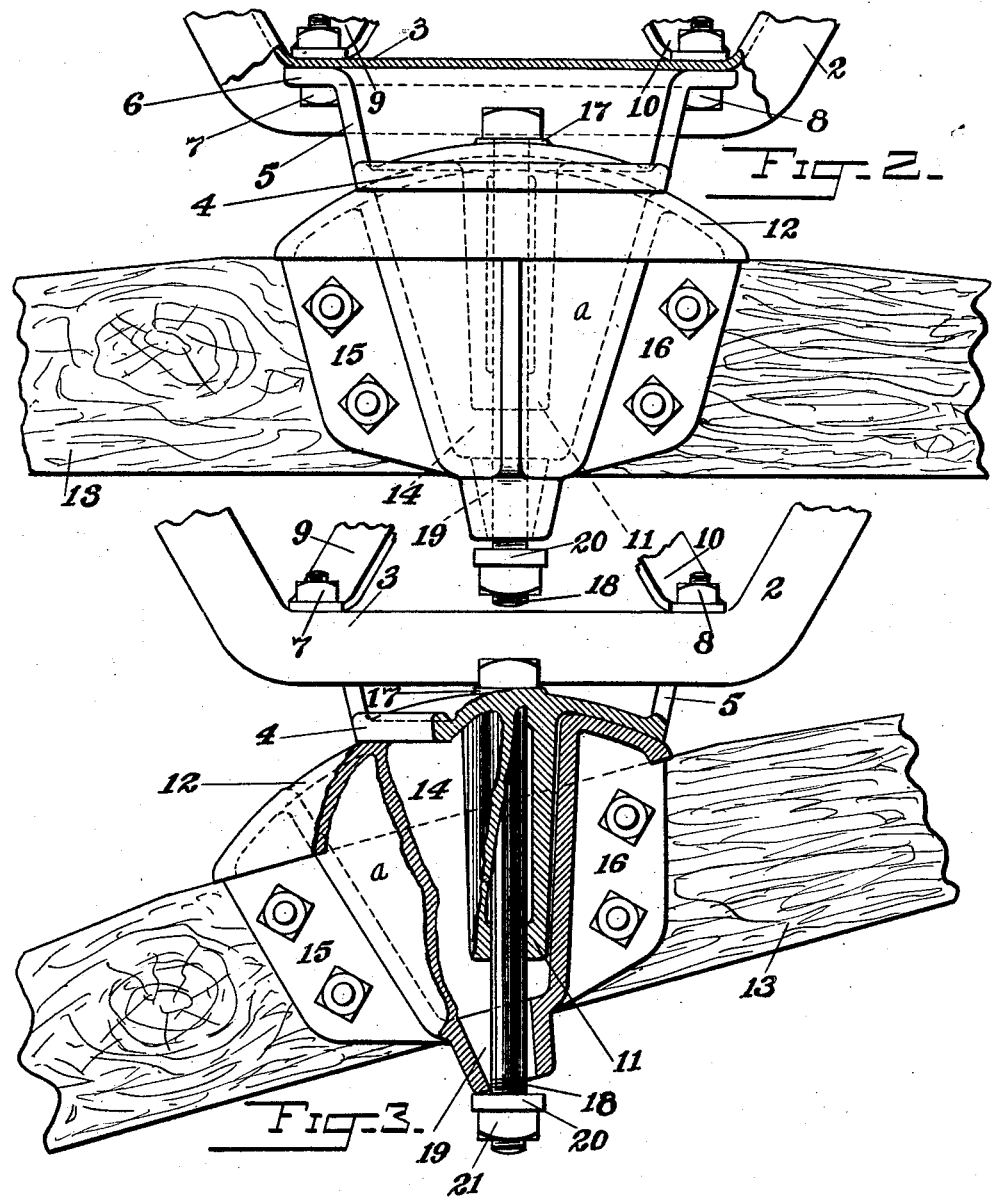

April 19, 1927.
L. B. NEIGHBOUR
AXLE CONNECTION FOR VEHICLES
Filed Aug. 4, 1921
1,625,139
3 Sheets-Sheet 3
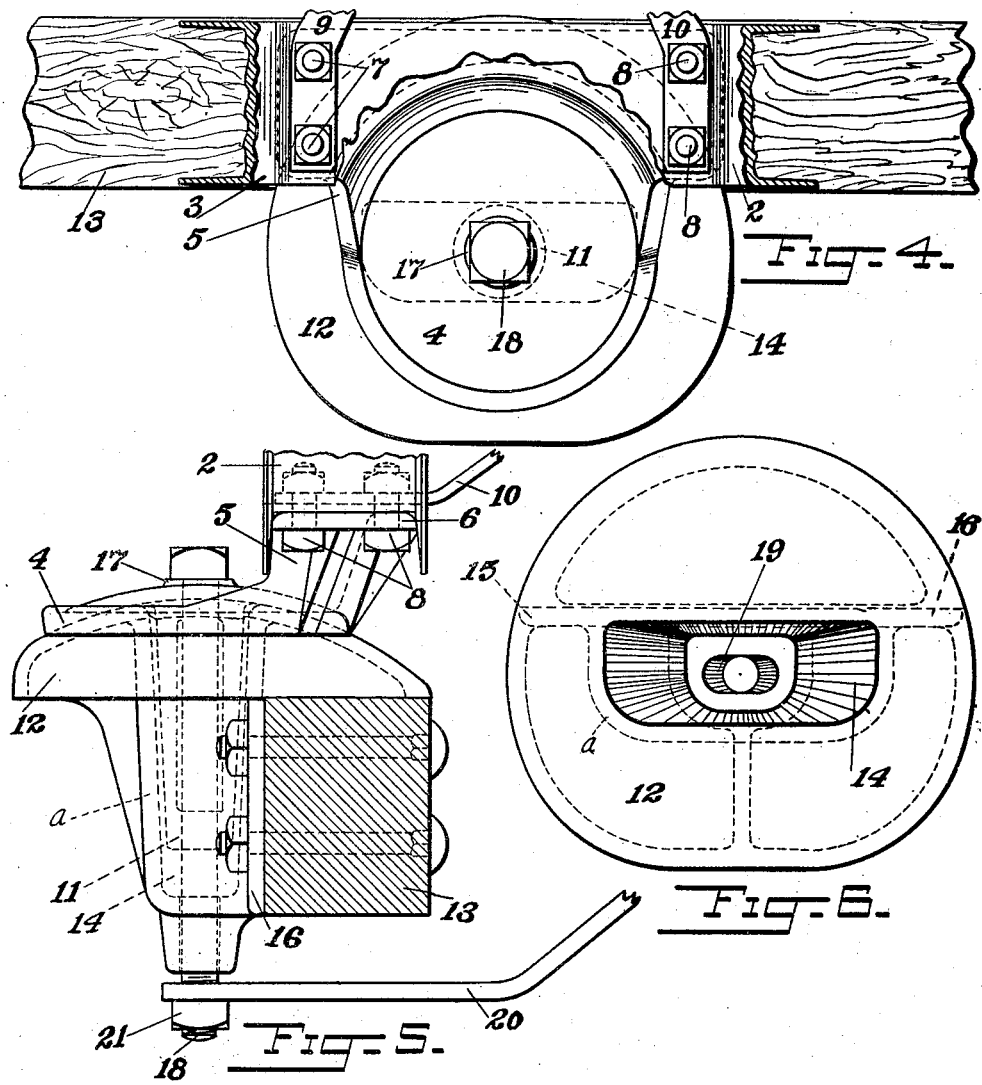

Patented Apr. 19, 1927.

1,625,139

UNITED STATES PATENT OFFICE.

LEONARD B. NEIGHBOUR, OF EAST MOLINE, ILLINOIS, ASSIGNOR TO DEERE & COMPANY, OF MOLINE, ILLINOIS, A CORPORATION OF ILLINOIS.

AXLE CONNECTION FOR VEHICLES.

Application filed August 4, 1921. Serial No. 489,832.

My invention relates to wheeled vehicles and more particularly to the connection therewith of the front axle, having especial reference to vehicles of abnormal top-heaviness, and the object of my invention is the construction of such a flexible connection to withstand strains incident to the support of a top-heavy vehicle, other objects being clearly set forth in the following specification.

Referring to the drawings in which similar numerals indicate identical parts—

Figure 1 is a side view in perspective, of a corn-sheller, illustrating the application of my invention. Figure 2 is an enlarged detail front elevation of my device. Figure 3 is a similar view in part section and with the axle tilted. Figure 4 is a plan view of Figure 2. Figure 5 is a side elevation of Figure 2, and Figure 6 is an enlarged plan view of one of the parts.

To the forward end of the under frame 1 of a corn-sheller is rigidly secured by suitable bolts an inverted yoke shaped member 2 the central part 3 of which is horizontal. Preferably I make the member 2 of channel steel, affording lightness of the part without sacrifice of strength. Secured to the inverted yoke 2, forward of and a little below it, is a horizontally disposed member 4, provided at its under side with a concave bearing surface, said member being preferably secured to the yoke by a support 5 integral with said member and extending upwardly and rearwardly therefrom, as shown in Figure 5. At its top, said support is provided with a horizontal plate 6, which is secured to the yoke between the webs thereof, by bolts 7 and 8, which are also used for attaching braces 9 and 10 to the central part of the yoke. Said braces extend rearwardly and are connected to the under frame 1. Centrally of the member 4, and extending downwardly therefrom, is a tapered tubular body 11 integral with the member 4.

Below the bearing member 4, the axle carries a co-operating bearing member 12, which is provided at its upper side with a convex surface of greater area but of the same curvature as that of the concave bearing surface of the upper member 4. As best shown in Figure 5 the member 12 has a part which extends over and rests on the axle 13. Integral with the member 12 and extending downwardly, forwardly of the axle 13, is a hollow tapered body $a$ having a socket 14 for reception of the tubular part 11 of the upper member 4. The socket 14 is oblong in cross section with its greater diameter parallel with the axle 13 to provide sufficient space for lateral movement of the tubular part 11 of the upper member 4. The lower member 12 is rigidly secured to the axle 13 by bolts which extend through the axle and through flanges 15 and 16 extending respectively from opposite sides of the wall of the chamber 14 and integral therewith.

On the upper surface of the member 4 is a central boss 17 perforated for reception of a king bolt 18 the head of which rests on the boss 17. The king bolt 18 projects downwardly through the tubular part 11 of the upper member 4, so that it is held in fixed relation to the latter member, and it extends through a downwardly tapered opening 19 in the bottom of the chamber 14 and a perforation in a brace 20, the latter exending rearwardly to the under frame 1 where it is secured; the lower end of the bolt is threaded to receive a nut 21.

As before stated I consider my invention as particularly valuable for vehicles which are in any degree top-heavy, but it also presents advantages for vehicles of the ordinary type, as the broad bearing of the concavo-convex bearing surfaces of the upper and lower members 4 and 12, movable concentrically one upon the other when the axle or the vehicle body or axle tilts laterally, avoids the imposition of strains in consequence of such movement. The extent of the bearing surfaces is constant whether the members 4 and 12 are moving laterally relatively to each other when the axle or the vehicle is tilted, or when the members are rotated relatively to each other by a change in the direction of travel of the vehicle.

The greater diameter of the socket in the tapered body 14 is parallel with the axle 13, and the lesser diameter, at a right angle thereto, is slightly greater than the diameter of the tubular body 11, consequently the axle and vehicle are free to rock under a tilting stress in a direction transversely of the vehicle, but the axle is prevented from a forward or backward rocking movement to any considerable extent.

What I claim is—

1. In a wheeled vehicle, the combination with an axle, of means connecting the axle to the vehicle, comprising supporting members secured respectively to the axle and to the vehicle, and having coacting bearing surfaces of constant extent and movable one upon the other rotatably and in a direction transversely of the vehicle, one of said supporting members having an oblong tapered socket, and the other having a member extending into said socket and movable therein transversely of the vehicle, and means for holding said members in operative relation to each other.

2. In a wheeled vehicle, the combination with an axle, of means connecting the axle to the vehicle, comprising supporting members secured respectively to the axle and to the vehicle, one of said members having a convex bearing surface adapted to cooperate with a concave bearing surface carried by the other member, said bearing surfaces being movable one upon the other rotatably and concentrically in a direction transversely of the vehicle, one of said supporting members having an oblong tapered socket, and the other having a member extending into said socket and movable therein transversely of the vehicle, and means for holding said members in operative relation to each other.

3. In a wheeled vehicle, the combination with an axle, of a member secured to the axle and having a convex bearing surface, a downwardly extending body, and a tapered socket in said body, a member secured to the vehicle and having a concave bearing surface curved concentrically with and resting on the convex bearing surface of the member on the axle, and a tubular body extending into said socket to bear laterally against the inner surface thereof, and rotatable therein, and a king-bolt securing said members together.

4. In a wheeled vehicle, the combination with an axle, of a member secured to the axle and having a convex bearing surface, a downwardly extending body, and an oblong tapered socket in said body having its greater diameter parallel with the axle, a member secured to the vehicle and having a concave bearing surface curved concentrically with and resting on the convex bearing surface of the member on the axle, and a tubular body extending into said socket, and a king-bolt securing said members together.

5. In a wheeled vehicle, the combination with an axle, and a vehicle body supported thereby, of means connecting the axle with the vehicle body comprising cooperating bearing members carried by the axle and body, respectively, one of said bearing members having an oblong tapered socket having its greater diameter parallel with the axle, and the other a member extending into said socket and adapted to rotate and to swing laterally therein, and a king bolt mounted in fixed relation to one of said bearing members and having rocking engagement with the other bearing member, for holding said bearing members in operative relation to each other.

6. In a wheeled vehicle, the combination with an axle, and a vehicle body supported thereby, of means connecting the axle with the vehicle body comprising cooperating bearing members carried by the axle and body, respectively, one of said bearing members being provided with an oblong tapered socket having its greater diameter parallel with the axle, and a convex bearing surface, and the other bearing member having a concave bearing surface curved concentrically with and adapted to bear on said convex bearing surface, and a tubular member extending into said socket and adapted to rotate and to swing laterally therein, and a king bolt extending through said tubular member and having rocking engagement with the other bearing member, for holding said bearing members in operative relation to each other.

LEONARD B. NEIGHBOUR.